United States Patent [19]

Baumbach

[11] 4,262,317
[45] Apr. 14, 1981

[54] LINE PROTECTOR FOR A COMMUNICATIONS CIRCUIT

[75] Inventor: Bertram W. Baumbach, Franklin Park, Ill.

[73] Assignee: Reliable Electric Company, Franklin Park, Ill.

[21] Appl. No.: 22,715

[22] Filed: Mar. 22, 1979

[51] Int. Cl.³ .............................................. H02H 9/04
[52] U.S. Cl. ................................... 361/124; 361/119; 337/32; 337/34
[58] Field of Search ............... 361/124, 119, 118, 117, 361/56, 126, 127, 128, 125, 91; 337/15, 28, 29, 30, 31, 32, 33, 34

[56] References Cited

U.S. PATENT DOCUMENTS

| | | | |
|---|---|---|---|
| 2,404,999 | 7/1946 | Wallace | 337/33 |
| 3,824,431 | 7/1974 | Schlicke | 361/126 |
| 3,934,175 | 1/1976 | Clark | 361/118 X |
| 3,975,664 | 8/1976 | Baumbach | 361/56 X |
| 3,992,652 | 11/1976 | Blaisdell et al. | 361/120 X |
| 4,015,228 | 3/1977 | Eda et al. | 337/28 |
| 4,021,759 | 5/1977 | Campi | 361/119 X |
| 4,092,694 | 5/1978 | Stetson | 361/126 |

*Primary Examiner*—Patrick R. Salce
*Attorney, Agent, or Firm*—Trexler, Wolters, Bushnell & Fosse, Ltd.

[57] ABSTRACT

A protector for a communications line comprises a three electrode gas tube surge voltage arrester as a primary protective device and metal oxide varistors as additional protective devices. In series with each side of the line, is an inductor that serves to isolate the gas tube from the varistors at relatively fast rise times of transient overvoltages. The gas tube, the varistors and the inductors are all mounted in a single housing that is divided into adjacent sections by an insulating member. The gas tube is in one section and the inductors and varistors are in the other section, the inductors being side-by-side and each coaxial with a pin that is adapted to be connected to the line.

6 Claims, 5 Drawing Figures

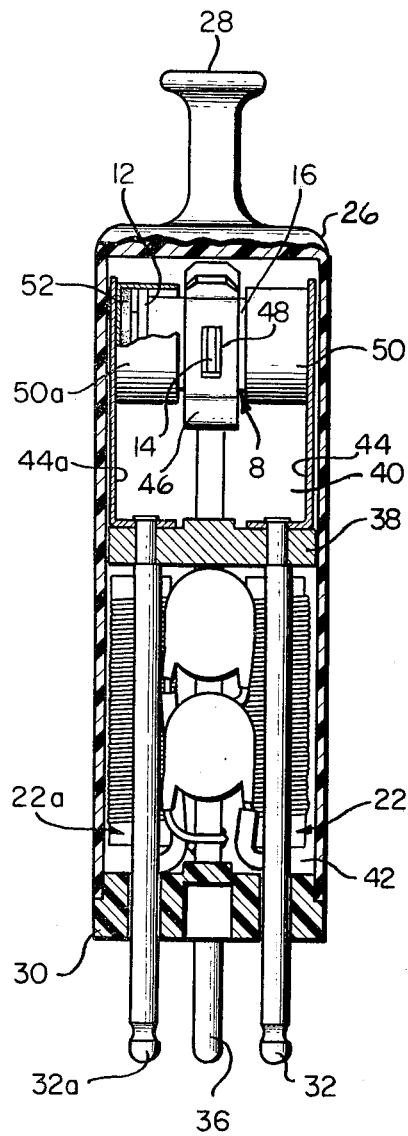
FIG.1
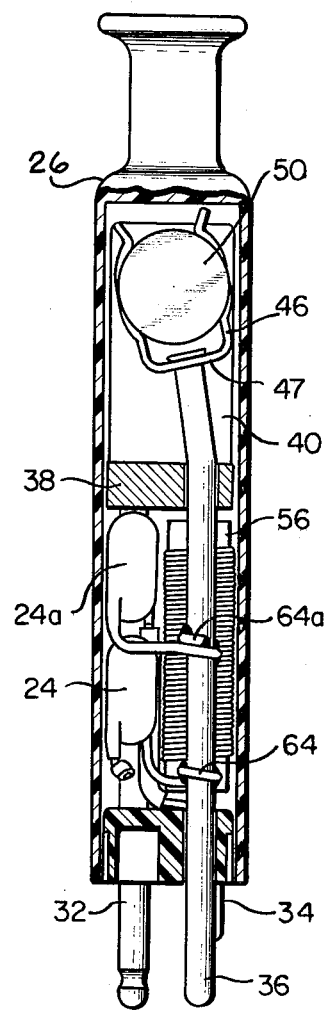
FIG.2
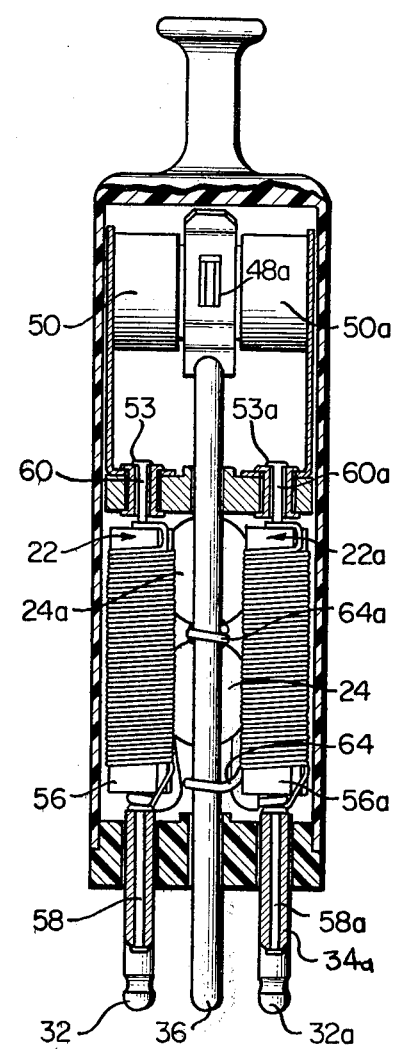
FIG.3
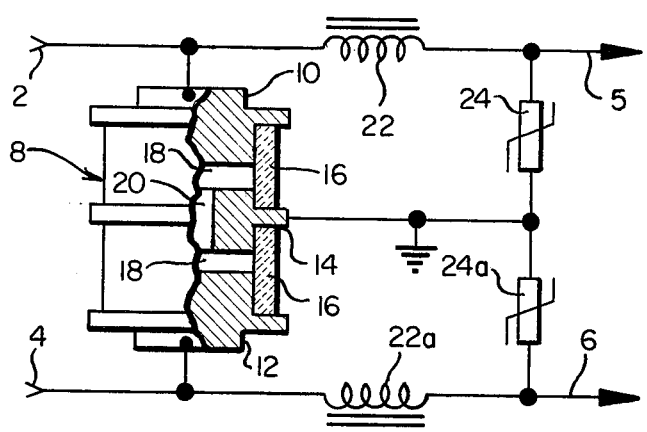
FIG.4
FIG.5

LINE PROTECTOR FOR A COMMUNICATIONS CIRCUIT

BACKGROUND OF THE INVENTION

This invention relates to improvements in line protectors for communications circuits. More particularly the present invention is directed to a plug-in type of module that is used for protecting central office equipment from surge voltages that are applied to the incoming lines, although the invention is adaptable to other types of line protection generally.

Prior art devices for protecting central office equipment are known, for example, by U.S. Pat. No. 3,975,664 that issued Aug. 17, 1976. In devices of that kind protection against surge voltages on either side of the line is provided by a three electrode gas tube in which two of the electrodes are connected respectively to the opposite sides of the line while the third electrode is connected to the ground. The device further includes caps which are in conductive contact with the respective electrodes and are spaced from a grounding clip that is in turn connected to the ground electrode. Spring pressure is applied to these caps tending to force them toward engagement with the grounding clip. In normal operation actual engagement of those caps with the grounding clip is prevented by a solder pellet which melts in an overcurrent condition. Then, the spring pressure is no longer resisted and a direct metallic contact is made between a line electrode and ground.

Another type of surge voltage arrester arrangement is shown in U.S. Pat. No. 3,934,175 that issued Jan. 20, 1976. In that patent, the circuit utilizes a spark gap device as a primary surge arrester and an avalanche semi-conductor element connected in parallel therewith as a secondary surge arrester which serves to quench the energy of the power surge which is not dissipated by the spark gap arrester. The arrangement utilizes a delay line that includes a series connected inductor and a resistor that serves to prevent the avalanche semi-conductor from clamping the spark gap device. The inductor serves to isolate electrically the semi-conductor from the gas tube at relatively fast transient voltage rise times while the resistor provides sufficient voltage drop at slow rise time to limit the damping voltage of the semi-conductor so as to allow the gas tube to fire.

In theory, a surge voltage arrester of the type shown in the aforesaid U.S. Pat. No. 3,975,664 could be used with a separate and distinct unit that includes inductors and semi-conductor elements for each side of the line. Such an arrangement would, however, be relatively cumbersome and would not be suitable for plug-in connection to an existing connector block.

OBJECTS AND SUMMARY OF THE INVENTION

An object of the present invention is to provide a line protector incorporating a surge voltage arrester of the spark gap type and a secondary surge arrester of the semi-conductor type together with an inductor in the line circuit that serves to isolate electrically the semi-conductor from the spark gap device at relatively fast rise times of transient overvoltages, and wherein the circuit components are uniquely mounted in a housing with projecting pins that can be plugged into existing connector blocks.

In one form the invention may comprise a line protector having an insulating means, a spark gap type of surge voltage arrester having opposed electrodes, conductive elements on said insulating means and projecting in one direction therefrom and in electrical contact respectively with the opposed electrodes, an inductor with opposed terminals, a semi-conductor having opposite terminals, the inductor being electrically connected at one terminal to one terminal of the semi-conductor and electrically connected at its other terminal to one of the electrodes, the inductor projecting in the opposite direction from said insulating means, the other electrode and the other terminal of the semi-conductor being connected to a ground terminal, and line terminals in series with said inductor and comprising pins extending from said insulating means in said opposite direction.

Looked at another way, the invention may also comprise a line protector comprising a line circuit including an inductor, a first normally open ground circuit connected to said line circuit and including a spark gap overvoltage arrester and means forming a direct metallic circuit from line to ground in the event of an overcurrent condition on the line, a second normally open ground circuit connected to the line and including overvoltage arrester means of the semi-conductor type, first and second ground circuits being electrically connected to opposite ends of said inductor, a housing in which the components are mounted, said housing having a base and divider means in space relation to said base to divide the housing into adjacent sections, one of said sections housing the spark gap arrester and the other of said sections housing the inductor and the arrester of the semi-conductor type.

Still further the invention may be considered as a line protector including a line circuit having an inductor and line terminals electrically connected at opposite ends respectively of the inductor, a ground terminal, a first grounding circuit electrically connected to said ground terminal and electrically to one side of said inductor and comprising a semi-conductor that normally is non-conducting but which becomes conducting and grounds the line at a surge voltage above a first magnitude, a second grounding circuit also connected electrically to said ground terminal and electrically to the other side of said inductor, said second grounding circuit including a spark gap overvoltage arrester having an electrode electrically connected to the line circuit and a ground electrode electrically connected to the ground terminal, said electrodes having a spark gap therebetween with a breakdown voltage above said first magnitude, the inductor serving to isolate electrically the semi-conductor from the spark gap overvoltage arrester at relatively fast rise times of transient overvoltages, a housing in which the components of said circuits are mounted, one of said line terminals being a pin that is coaxial with said inductor.

BRIEF DESCRIPTION OF THE FIGURES

FIG. 1 is a front elevational view, partially broken away and in section, of a line protector constructed in accordance with and embodying the present invention;

FIG. 2 is a right side elevation view of the line protector of FIG. 1, partially broken away and in section;

FIG. 3 is a rear elevational view of the line protector of FIG. 1, partially broken away and in section;

FIG. 4 is a fragmentary sectional view of a portion of FIG. 1 with further parts broken away to illustrate certain features of the invention; and FIG. 5 is a schematic diagram of the circuit of the protector and also showing certain structural features of the gas tube surge voltage arrester.

DETAILED DESCRIPTION

Referring now more in detail to the drawing, and in particular to FIG. 5, there is shown a circuit diagram of the line protector of this invention. Incoming lines 2, 4 represent a line pair from the outside of a building and which go by way of conductors 5, 6 to inside building equipment. Typically, the lines 2,4 are identified as tip and ring. Shunted across the incoming lines 2,4 is a spark gap surge voltage arrester in the form of a cold cathode gas tube 8. The gas tube 8 has a first electrode 10 that is connected to the line 2 and a second electrode 12 that is connected to the line 4. The gas tube 8 may be of the three electrode type and so includes a center or ground electrode 14. The three electrodes 10, 12, 14 are separated by cylindrical ceramic spaces 16, 16 so as to define arc gaps 18, 18 between each electrode 10 or 12 and the ground electrode 14. The ground electrode 14 has a center hole 20 to provide communication between the gaps 18, 18.

In series with the line 2 is an inductor 22, and similarly in series with the line 4 is an inductor 22a. Shunted across each line 2,4 to ground are secondary surge arresters in the form of avalanche semi-conductor devices 24, 24a, the breakdown voltages of which are less than the breakdown voltage of the gas tube. Preferably, the devices 24, 24a are metal oxide varistors. From the circuit diagram and from structure hereafter described one terminal of each of the inductors 22, 22a is electrically connected to a line electrode 10 or 12, as the case may be. The opposite terminals of the inductors 22, 22a are connected respectively to the ungrounded terminals of the semi-conductor devices 24, 24a.

The inductors 22, 22a isolate the gas tube 8 and prevent the varistors 24, 24a from clamping the gas tube during fast rises of surge voltage. Thus, the voltage across the gas tube to cause firing of either gap 18, 18 builds up more rapidly than would be the case if the inductors 22, 22a were not employed in the circuit. The semi-conductor devices 24, 24a give back-up protection at low voltage, namely below the firing voltage of the gas tube. Furthermore, the devices 24, 24a dissipate a portion of the energy that is not dissipated by the gas tube arrester 8. Consequently, in a typical situation involving a fast rise time of a surge voltage, the gas tube will fire, dissipating a major portion of the energy of the surge. The devices 24, 24 will ground out the remaining portion of the power surge.

In order to mount the circuit components of FIG. 5 into a housing to form a module that can be plugged into a connector block, the arrangement of FIGS. 1-4 is provided. A dielectric plastic housing 26 has a generally rectilinear shape having an upper end that is closed and is provided with a handle 28. At the lower or opposite end of the housing is a plastic insulating base 30 that snap fits with the wall of the housing 26 in a conventional manner, as for example shown in the aforesaid U.S. Pat. No. 3,975,644. Projecting through the insulating base 30 are terminal pins 32, 34, 32a, 34a, 36. The long pin 32 constitutes a first incoming line pin and is in electrical connection with the line 2. The short pin 34 is a central office pin and is in electrical connection with the conductor 5. Similarly, the long pin 32a is in electrical connection with the incoming line 4 while a short pin 34a is in electrical connection with the line 6. Pin 36 is the ground pin.

Within the housing and spaced from both the base 30 and the end of the housing having the handle 28 is an insulating means in the form of a sub-base or shelf 38. This shelf 38 divides the interior of the housing 26 into adjacent cavities or sections 40, 42. The section 40 houses the overvoltage arrester 8 and associated components while the section 42 houses the varistors 24, 24a and the inductors 22, 22a. The array of the pins 32, 34, 32a, 34a, 36 is such that the module may be plugged into and removed from a conventional connector block.

The line pins 32, 32a have reduced upper end portions as shown in FIG. 1 which project through the shelf 38 and are staked in place. The line pins 32, 32a also are staked and/or soldered to L-shaped spring plates 44, 44a, the upper end portions of which are closely adjcent to the housing wall and are spring biased toward each other. The spring plates 44, 44a are insulated from each other. A U-shaped grounding clip 46 is connected to the center electrode 14 and has opposed slots 48, 48a (FIGS. 1 and 3) for receiving the rim portion of the electrode 14. The gas tube 8 is received within opposed caps 50, 50a, which open up toward each other. Each cap receives one of the electrodes 10 or 12 and a portion of a ceramic spacer 16. Interposed between a line electrode 10 or 12 and the associated cap 44 or 44a is a solder pellet 52 shown in FIG. 1 with respect to the cap 50a, it being understood that there is a like solder pellet within the cap 50.

The solder pellets 52 normally maintain the caps 50, 50a spaced from the opposed edges of the grounding clip 46. However, in an overcurrent condition due to a sustained overvoltage, the heat generated by the gas tube 8 will be transmitted to one or both of the solder pellet 52 causing one or both of them to melt. The spring action of the plates 44, 44a then press one or both of the caps 50 or 50a into contact with the grounding clip 46 to ground the line. The grounding clip 46 has its bight portion 47 (FIG. 2) staked to the ground pin 36, which may be slightly bent near its upper end to accommodate the grounding clip 46. The ground pin 36 projects through the shelf 38 as well as through the housing section 42 and outwardly through the plastic base 30.

The spring plates 44, 44a are thus secured to the shelf 38 and project therefrom in one direction whereby the spring plates and the gas tube lie within the section 40. On the other hand, the inductors 22, 22a and the varistors 24, 24a in effect constitutes a structure that projects in the opposite direction from the shelf 38 so as to lie within the housing section 42.

The inductors 22, 22a are wound upon cylindrical cores 56, 56a which may be of a low magnetic permeability, such as ferrite. Embedded in and extending from the opposite ends of the cores 56, 56a are electrically conductive wire leads 58, 60, 58a, 60a that are relatively rigid, at least sufficient to provide structural supports for the cores 56, 56a. The heavy leads are coaxial with the cores 56, 56a. The leads 58, 60, 58a, 60a are effectively insulated from each other due to the high resistance of the core 56 or 56a. The leads 58, 60, 58a, 60a may also be bonded to the cores by a dielectric resin that further isolates opposite leads. The smaller gauge wires at the opposite ends of the winding of inductor 22 are soldered respectively to the heavy leads 58, 60; the wires at the opposite ends of the winding of inductor 22a are soldered respectively to the heavy leads 58a, 60a. As seen in FIG. 3, the leads 58, 60 telescope respectively into the line pin 34, which is hollow for that purpose, and into a metal eyelet 53 that also projects through the shelf 38. Similarly, leads 58a, 60a telescope into line pin 34a and into metal eyelet 53a. Those telescoped joints may be soldered in place so that the inductors are firmly supported side-by-side within the housing section 42. Electrical continuity between pins 34, 34a and the associated spring plates is provided by eyelets 53, 53a.

The varistors 24, 24a are also housed, one above the other, within the section 42 between the inductors and a wall of the housing 26. A wire lead 62 from varistor 24 is soldered to the inductor lead 58 while a wire a lead 62a from varistor 24a is soldered to inductor lead 58a. The other varistor leads 64, 64a are soldered to the ground pin 36. The varistor leads are of sufficiently low wire gauge to support the varistors in place between the central office pins 32, 32a.

The invention is claimed as follows:

1. A line protector for a communications circuit comprising a line circuit including an inductor with opposite terminals, a first normally open ground circuit connected to said line circuit and including a spark gap overvoltage arrester and means forming a direct metallic circuit from line to ground in the event of an overcurrent condition on said line, a second normally open ground circuit connected to the line circuit and including overvoltage arrester means of a semi-conductor type, the first and second ground circuits being electrically connected to opposite terminals of said inductor, a housing in which the components are mounted, said housing having a base and divider means in spaced relation thereto to divide the housing into adjacent sections, one of said sections housing the spark gap arrester and the other of said sections housing the inductor and said arrester of the semi-conductor type.

2. A line protector according to claim 1 including line pins in said line circuit, a ground pin in each ground circuit, said pins projecting through said base and into said divider means.

3. A line protector according to claim 2 further including leads on said inductor supported by said base and by said divider.

4. A line protector according to claim 1 in which said arrester of the semi-conductor type is a metal oxide varistor, the spark gap arrester is of the three electrode gas tube type, and one of said three electrodes is electrically connected to a ground pin that is in each ground circuit.

5. A line protector for a communications circuit comprising an insulating means, a spark gap type of surge voltage arrester having opposed electrodes, conductive elements on said insulating means and projecting in one direction therefrom and in electrical contact respectively with said opposed electrodes, an inductor with opposite terminals, a semi-conductor having opposite terminals, the inductor being electrically connected at one terminal to one terminal of the semi-conductor and electrically connected at its other terminal to one of said electrodes, the inductor projecting in the opposite direction from said insulating means, the other electrode and the other terminal of said semi-conductor being connected to a ground terminal, and line terminals in series with said inductor and comprising pins extending from said insulating means in said opposite direction, and in which one of said line terminals is hollow and a lead from the inductor is telescoped within said hollow.

6. A line protector according to claim 5 in which the other of said inductor terminals projects into said insulating means for electrical connection to one of said conductive elements.

* * * * *

UNITED STATES PATENT AND TRADEMARK OFFICE
CERTIFICATE OF CORRECTION

PATENT NO. : 4,262,317
DATED : April 14, 1981
INVENTOR(S) : BAUMBACH, BERTRAM W.

It is certified that error appears in the above-identified patent and that said Letters Patent are hereby corrected as shown below:

Column 3, line 62, change "U.S. Pat. No. 3,975,644" to --U.S. Pat. No. 3,975,664--.

Signed and Sealed this

Twenty-fifth Day of August 1981

[SEAL]

Attest:

GERALD J. MOSSINGHOFF

Attesting Officer

Commissioner of Patents and Trademarks